(12) United States Patent
Wakrat et al.

(10) Patent No.: US 8,572,335 B2
(45) Date of Patent: *Oct. 29, 2013

(54) COPYBACK OPTIMIZATION FOR MEMORY SYSTEM (75) Inventors: Nir Jacob Wakrat, San Jose, CA (US); Mark Alan Helm, Santa Cruz, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,605

(22) Filed: May 21, 2012

(65) Prior Publication Data

US 2012/0233387 A1 Sep. 13, 2012

Related U.S. Application Data (63) Continuation of application No. 12/193,638, filed on Aug. 18, 2008, now Pat. No. 8,185,706.

(60) Provisional application No. 61/049,330, filed on Apr. 30, 2008.

(51) Int. Cl.
*G06F 12/00* (2006.01)

(52) U.S. Cl.
USPC ........................................ 711/154

(58) Field of Classification Search
None
See application file for complete search history.

(56) References Cited

U.S. PATENT DOCUMENTS

| 4,020,466 | A | 4/1977 | Cordi et al. |
| 5,732,275 | A | 3/1998 | Kullick et al. |
| 6,601,216 | B1 | 7/2003 | Obata |
| 7,287,209 | B2 * | 10/2007 | Wu ................. 714/781 |
| 7,362,611 | B2 | 4/2008 | Roohparvar |
| 2005/0172065 | A1 | 8/2005 | Keays |
| 2006/0050576 | A1 | 3/2006 | Kim |
| 2006/0288153 | A1 * | 12/2006 | Tanaka et al. ................. 711/103 |
| 2007/0048715 | A1 | 3/2007 | Miyamoto et al. |
| 2007/0089033 | A1 * | 4/2007 | Zeevi ............................ 714/763 |
| 2007/0237007 | A1 * | 10/2007 | Muraoka ................. 365/189.05 |
| 2007/0268905 | A1 | 11/2007 | Baker et al. |
| 2007/0276863 | A1 | 11/2007 | Shenfield |
| 2008/0147998 | A1 * | 6/2008 | Jeong ............................ 711/161 |
| 2008/0288712 | A1 | 11/2008 | Cornwell et al. |

FOREIGN PATENT DOCUMENTS

| EP | 691614 A1 | 1/1996 |
| JP | 11-259357 | 9/1999 |
| TW | I258074 | 7/2006 |

OTHER PUBLICATIONS

EP Search Report from European Patent Application No. EP 11 18 3929 dated Dec. 9, 2011, 10 pages.
International Search Report and Written Opinion of the International Searching Authority, PCT Application Serial No. PCT/US2009/039160, Oct. 9, 2009, 22 pp.
International Preliminary Report on Patentability and Written Opinion for Application No. PCT/US2009/039160, dated Nov. 11, 2010, 15 pages.

(Continued)

*Primary Examiner* — Duc Doan
(74) *Attorney, Agent, or Firm* — Meyertons, Hood, Kivlin, Kowert & Goetzel, P.C.

(57) ABSTRACT

In a copyback or read operation for a non-volatile memory subsystem, data page change indicators are used to manage transfers of data pages between a register in non-volatile memory and a controller that is external to the non-volatile memory.

17 Claims, 8 Drawing Sheets

(56) References Cited

OTHER PUBLICATIONS

Korean Notice of Preliminary Rejection from Korean Intellectual Property Office (KIPO) mailed Feb. 22, 2012, 4 pages. (English Translation, 3 pages).
U.S. Non-Final Office Action for U.S. Appl. No. 12/193,638 dated Apr. 25, 2011, 15 pages.
U.S. Non-Final Office Action for U.S. Appl. No. 12/193,638 dated Sep. 19, 2011, 13 pages.
U.S. Notice of Allowance for U.S. Appl. No. 12/193,638 dated Feb. 23, 2012, 16 pages.
Office Action in Japanese Application No. 2011-507514, issued Sep. 10, 2012, pp. 1-4.

* cited by examiner

COPYBACK OPTIMIZATION FOR MEMORY SYSTEM

RELATED APPLICATION

This application is a continuation (and claims the benefit of priority under 35 USC 120) of U.S. application Ser. No. 12/193,638, filed Aug. 18, 2008, now allowed, which claims the benefit of priority from U.S. Provisional Application No. 61/049,330, for "Copyback Optimization for Memory System," filed Apr. 30, 2008. Both of these prior applications are incorporated by reference herein in their entirety.

TECHNICAL FIELD

This subject matter is generally related to memory systems.

BACKGROUND

Flash memory is a type of electrically erasable programmable read-only memory (EEPROM). Because flash memories are non-volatile and relatively dense, they are used to store files and other persistent objects in handheld computers, mobile phones, digital cameras, portable music players, and many other devices in which other storage solutions (e.g., magnetic disks) are inappropriate. When data stored in flash memory is processed, a data page is read out of flash memory and stored in a register. The register contents is transferred to a controller that is external to the non-volatile memory for processing. The processed data page is placed back in the register so that the processed data page can be written back to flash memory.

SUMMARY

In a copyback or read operation for a non-volatile memory subsystem, data page change indicators are used to manage transfers of data pages between a register in non-volatile memory and a controller that is external to the non-volatile memory.

DETAILED DESCRIPTION

Examples of Memory Subsystems

Figure 1A:
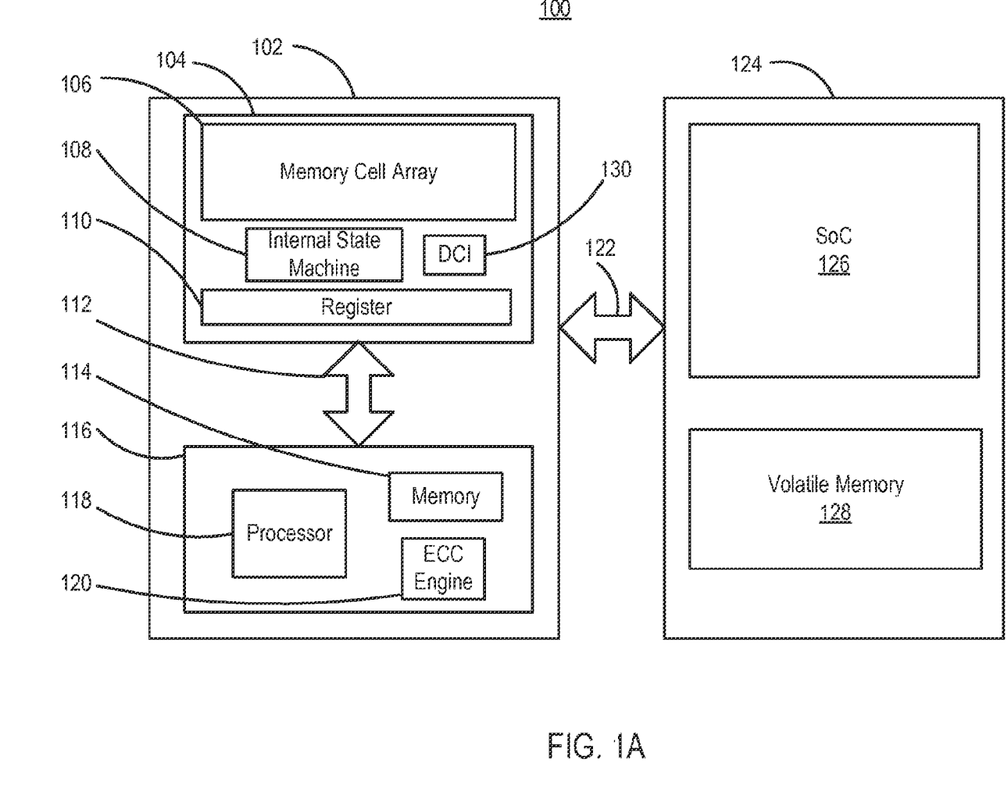
FIG. 1A is a block diagram of an example memory system for implementing an optimized copyback process.

FIG. 1A is a block diagram of an example memory system 100 for implementing an optimized copyback process. In some implementations, the system 100 can include a memory subsystem 102 coupled to a host device 124 through an external bus 122 (e.g., Open NAND Flash Interface (ONFI), ATA). The host device 124 can be any electronic device including but not limited to smart phones, media players, text messaging devices, portable computers, solid state drives, digital cameras, etc. The memory subsystem 102 can be any non-volatile memory subsystem (e.g., managed NAND).

The host device 124 can include a system-on-chip (SoC) 126 and volatile memory 128. The SoC 126 can include hardware and software for interacting with the memory subsystem 102, such as transmitting read and write requests made by applications running on the host device 124.

The memory subsystem 102 can include non-volatile memory 104 (also referred to as "raw memory") and an external controller 116. The memory 104 can include a memory cell array 106, an internal state machine 108, a memory register 110 and data change indicator (DCI) 130. The controller 116 can include a processor 118, volatile memory 114 and error correction code (ECC) engine 120. Other configurations for the memory subsystem 102 are possible. For example, a cache register can be included in the data path between the memory cell array 106 and the memory register 110 to allow the internal state machine to read the next data page from the memory cell array 106 while transferring the current page to the controller 116 over internal bus 112.

Figure 1B:
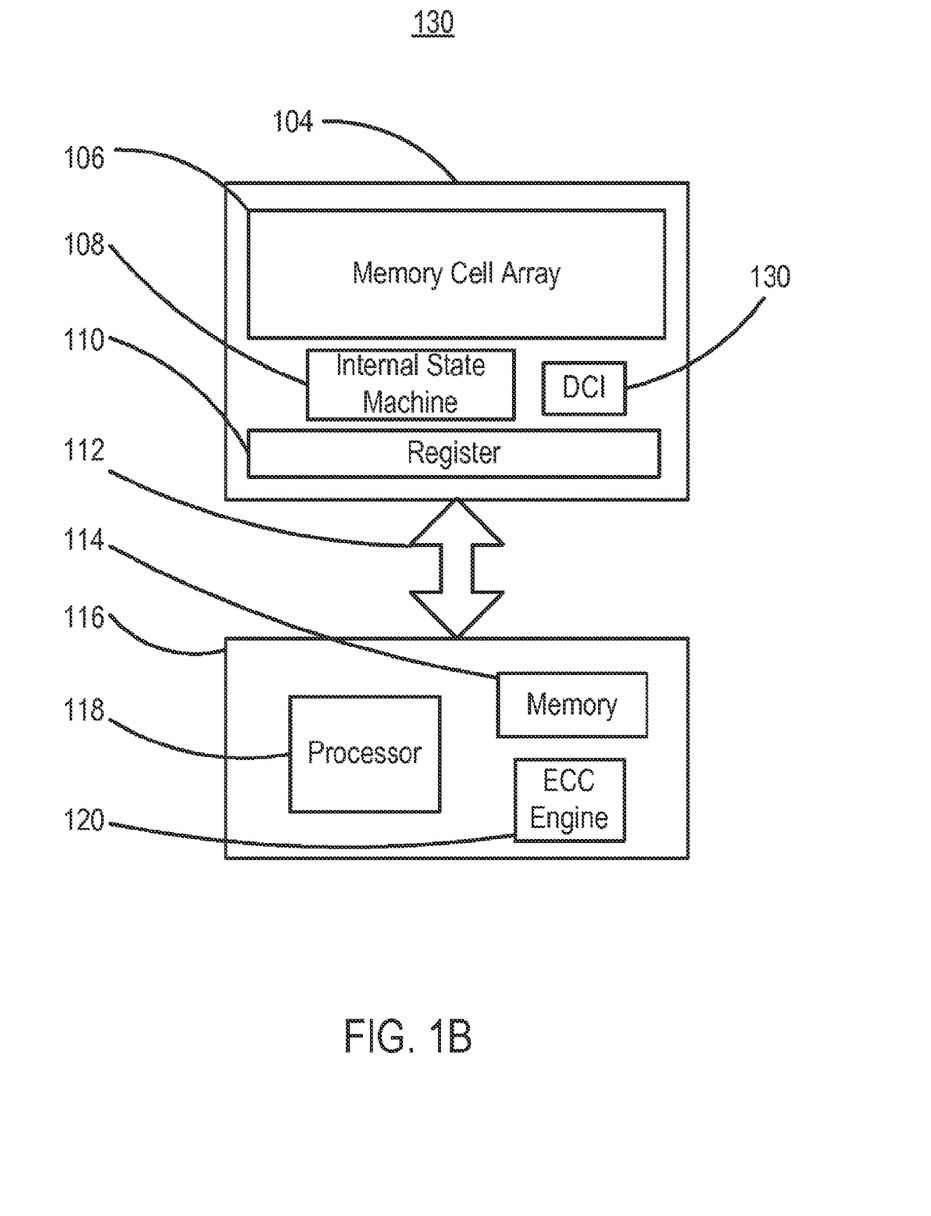
FIG. 1B is a block diagram of another example memory system for implementing an optimized copyback process.

FIG. 1B is a block diagram of another example memory system 130 for implementing an optimized copyback process. The system 130 shows only the memory subsystem 102, the operation of which was described in reference to FIG. 1A.

Copyback Operations

Copyback can be a memory subsystem command to move data from one page to another page. Copyback can be used in wear leveling and other non-volatile memory management operations. In a typical copyback operation, a data page is read from the memory cell array 106 and stored in the memory register 110 by the internal state machine. The external controller 116 reads or clocks the data page out of the memory register 110 so that the processor 118 can perform a desired operation on the data page (e.g., an ECC operation). The processed data page can be written back to the memory register 110 by the controller 116. The internal state machine 108 can write the contents of the memory register 110 into a new data page in the memory cell array 106. By avoiding the transfer of the entire contents of register 110 to the external controller 116, processing times and power consumption can be reduced.

Example Process For Writing New Data Pages

Figure 2:
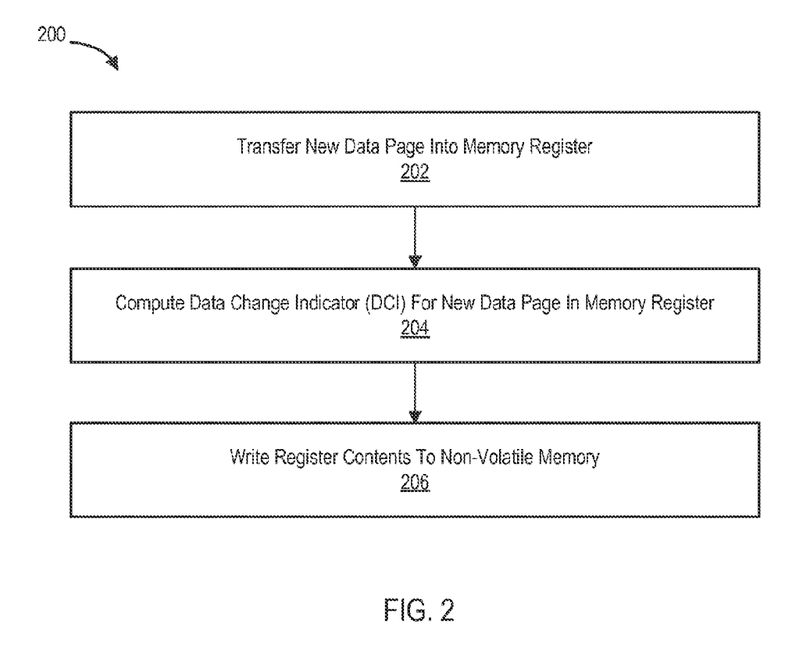
FIG. 2 is a flow diagram of an example optimized copyback process 200 for computing and storing data change indicators used by the memory systems of FIGS. 1A and 1B.

FIG. 2 is a flow diagram of an example optimized copyback process 200 for computing and storing data change indicators used by the memory systems of FIGS. 1A and 1B. In some implementations, the process 200 can begin when new data page is transferred into a memory register of a memory subsystem (202). A DCI can be computed for the data page and stored in the memory subsystem (204). Some examples of data change indicators can include error detection codes (EDCs), including but not limited to: checksum, Hamming code, parity bit, cyclic redundancy check (CRC), polarity symbol reversal, Turbo code, etc. An EDC can also be part of an ECC, such as Reed-Solomon code, Reed-Muller code, Binary Golay code, and low-density parity-check codes. After the DCIs are computed and stored, the register contents can be written to non-volatile memory (206). DCIs can be used for the optimized copyback process described in reference to FIGS. 3A-3C.

Example Optimized Copyback Process

Figure 3A:
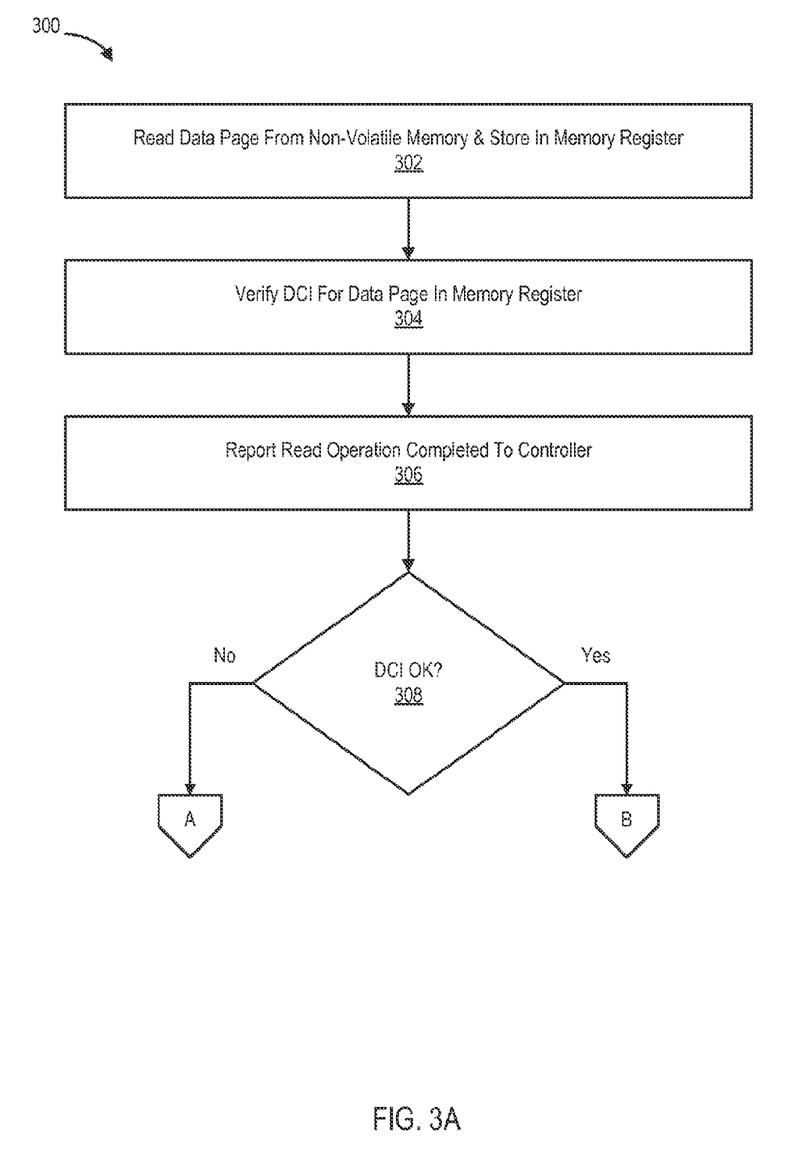
FIGS. 3A-3C are flow diagrams of an example optimized copyback process implemented by the memory systems of FIGS. 1A and 1B.
Figure 3B:
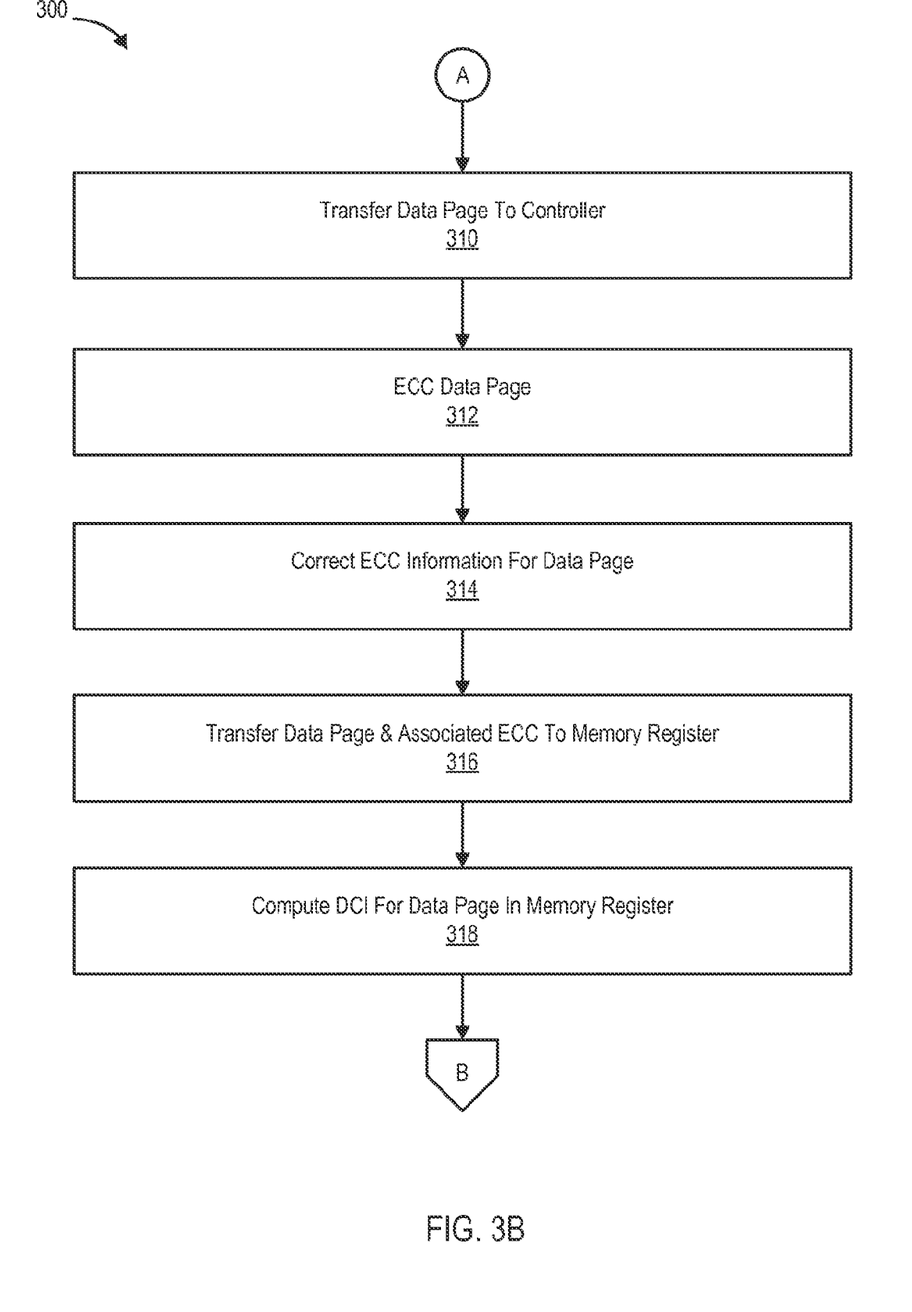
Figure 3C:
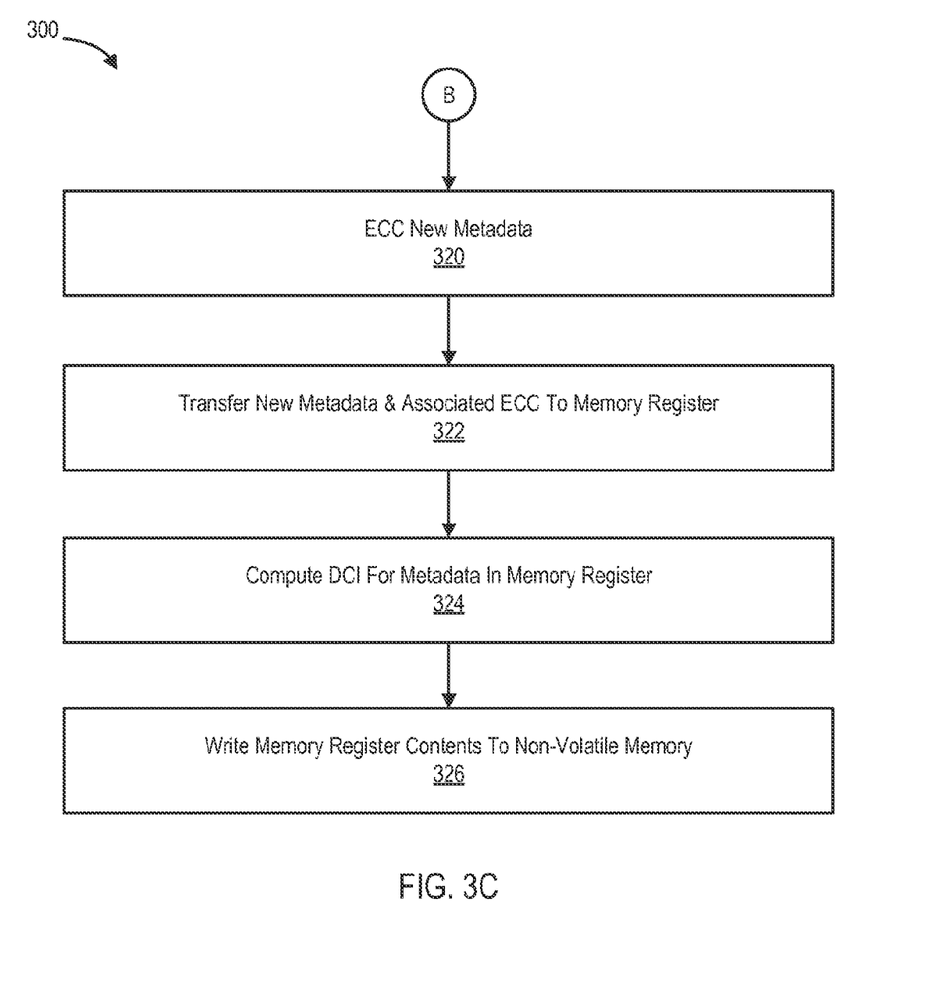

FIGS. 3A-3C are flow diagrams of an example optimized copyback process 300 implemented by the memory systems of FIGS. 1A and 1B. In some implementations, the process 300 can begin by reading a data page from non-volatile memory (e.g., memory cell array 106) and storing the data page in a memory register (302) (e.g., register 110). A DCI (e.g., DCI 130) can be verified for the data page in the memory register (304). In some implementations, the DCI can be previously computed and stored in the memory subsystem when the data page is first written to non-volatile memory (e.g., using process 200). In other implementations, the DCI can be computed "on the fly" as part of the read operation or as a separate operation. The memory subsystem can report to an external controller (e.g., external controller 116) that the read operation has completed (306).

If the DCI for the data page in the register indicates that the data page has changed (308), the data page can be transferred to the external controller (310), an ECC can be computed for the data page (312) and the ECC information for the data page can be corrected in the external controller (314). The data page and associated ECC can be transferred back to the memory register (316). A new DCI can be computed for the data page in the memory register (318).

If the DCI for the data page in the register indicates that the data page has not changed (308), an ECC can be computed for new metadata associated with the data page (320). The new metadata and associated ECC can be transferred to the memory register (322). A new DCI can be computed for the metadata in the memory register (324). The memory register contents can be written to a new data page in non-volatile memory (326).

Optimized Read Operation

Figure 4:
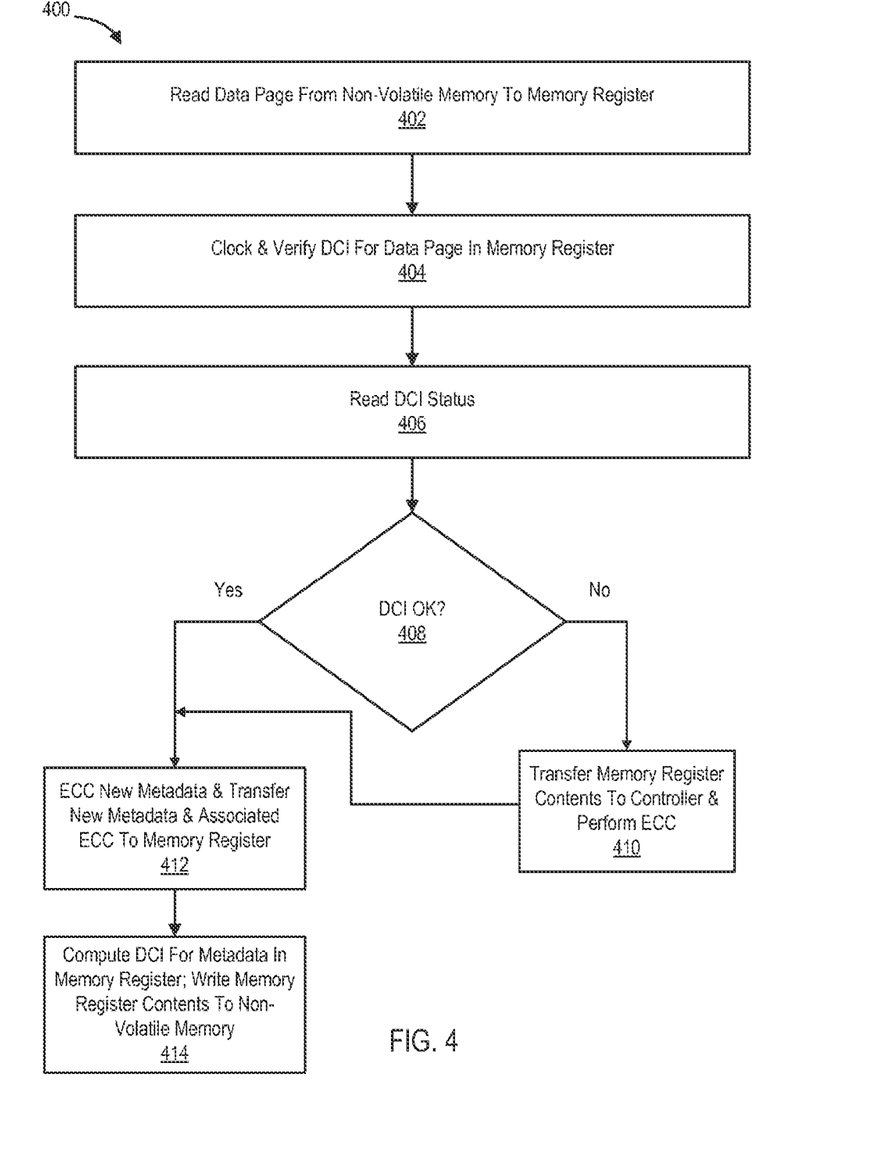
FIG. 4 is a flow diagram of an example optimized read operation implemented by the memory systems of FIGS. 1A and 1B.

FIG. 4 is a flow diagram of an example optimized read operation implemented by the memory systems of FIGS. 1A and 1B. In some implementations, the process 400 can begin by reading a data page from non-volatile memory and storing the data page in a memory register (402). A pre-computed DCI associated with the data page can be clocked into the memory register from a storage location in the memory subsystem and verified (404). The DCI can also be computed "on the fly." The status of the DCI can be read to determine if the data page has changed (406).

If the data page has changed (408), an ECC for the new metadata associated with the data page can be computed and transferred, together with the new metadata to the memory register (412). A new DCI can be computed for the metadata in the memory register and the register contents can be written to a new data page in non-volatile memory (414).

If the data page has not changed (408), the memory register contents can be transferred to an external controller and an ECC can be computed by the external controller (410). An ECC for the new metadata associated with the data page can be computed and transferred by the external controller, together with the new metadata to the memory register (412). A new DCI can be computed for the metadata in the memory register and the register contents can be written to a new data page in non-volatile memory (414).

Example Data Structures

Figure 5:
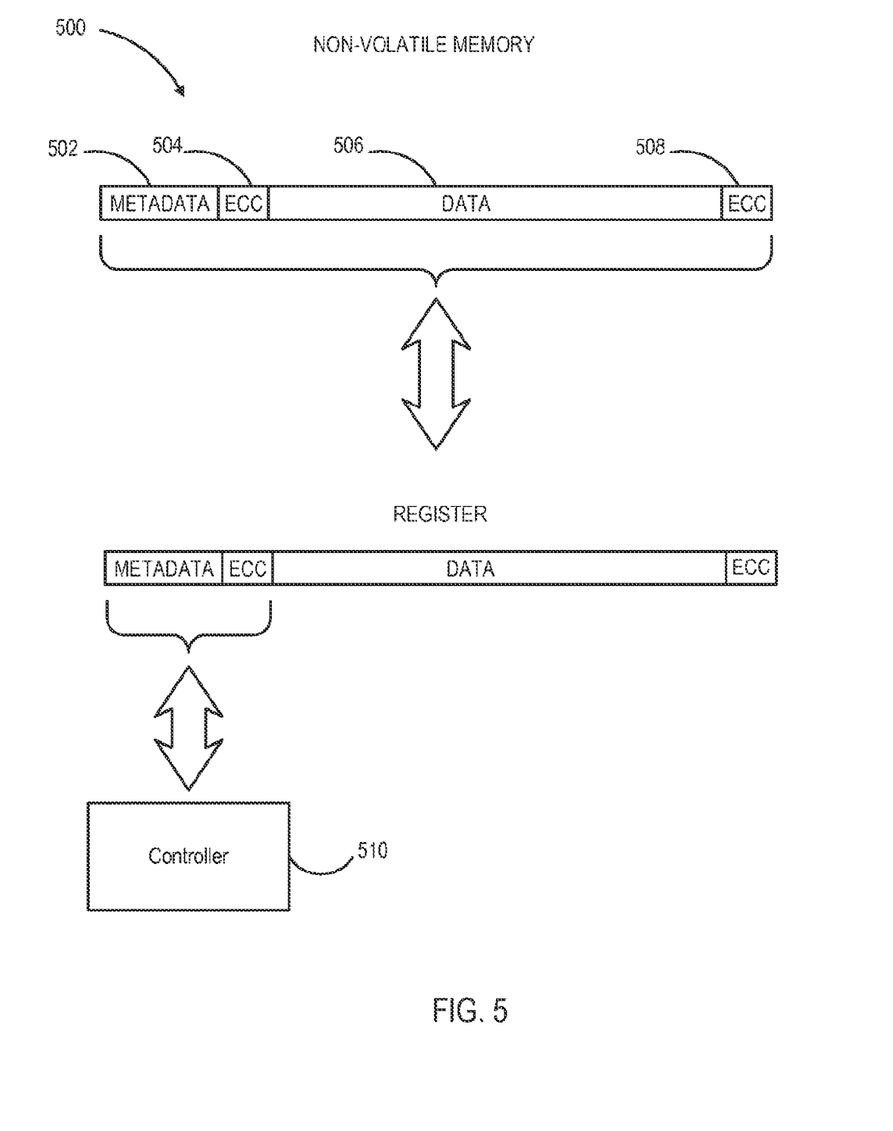
FIG. 5 illustrates example data structures used by the copyback process of FIGS. 3A-3C.

FIG. 5 illustrates example data structures used by the copyback process of FIGS. 3A-3C. In the example shown, a data page 500 in non-volatile memory includes metadata 502, metadata ECC 504, data 506 and data ECC 508. If the data has not changed than only the metadata 502 and the metadata ECC 504 are transferred from the register to the external controller 510 for processing. The processed metadata 502 and metadata ECC 504 are transferred back to the memory subsystem and stored in the memory register. The data page can the be written to a new data page in non-volatile memory (e.g., a memory cell array).

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
receiving a data page, wherein the data page includes data, metadata, an Error Correction Code (ECC) for the data, and an ECC for the metadata;
computing an initial data change indicator (DCI) for the received data page;
storing the data page in a non-volatile memory of a memory subsystem;
retrieving the data page from the non-volatile memory;
determining if the data page has changed;
sending the data page to a controller responsive to the determination that the data page has changed; and
sending a portion of the data page to the controller responsive to the determination that the data page has not changed, wherein the portion of the data page excludes the data.

2. The method of claim 1, further comprising storing the computed initial DCI for the received data page.

3. The method of claim 2, wherein the determining if the data page has changed comprises reading the stored initial DCI.

4. An apparatus, comprising:
a non-volatile memory including a memory array, and a register; and
a controller coupled to the non-volatile memory and configured to:
receive a data page, wherein the data page includes data, metadata, an Error Correction Code (ECC) for the data, and an ECC for the metadata;
store the data page in the register;
compute an initial data change indicator (DCI) for the received data page;
store the initial DCI in the memory array;
transfer the data page from the register to the memory array responsive to the storing of the initial DCI in the memory array;
retrieve the data from the memory array;
determine if the data page has changed; and
perform an operation on the data page responsive to the determination that the data page has changed.

5. The apparatus of claim 4, wherein the non-volatile memory further includes an internal state machine configured to transfer the data page from the memory array to the register.

6. The apparatus of claim 4, wherein the controller further includes an error correction code (ECC) engine.

7. The apparatus of claim 6, wherein the controller is further configured to perform an operation on the metadata included in the data page responsive to the determination that the data page has not changed.

8. The apparatus of claim 7, wherein the ECC engine is configured to generate an ECC dependent upon the initial DCI.

9. A memory subsystem, comprising:
- means for receiving a data page, wherein the data page includes data, metadata, an Error Correction Code (ECC) for the data, and an ECC for the metadata;
- means for computing an initial data change indicator (DCI) for the data page;
- means for storing the data page in a non-volatile memory of a memory subsystem;
- means for retrieving the data page from the non-volatile memory;
- means for determining if the data page has changed;
- means for sending the data page to a controller responsive to determining the data page has changed; and
- means for sending a portion of the data page to the controller responsive to determining the data page has not changed, wherein the portion of the data page excludes the data.

10. The memory subsystem of claim 9, wherein the means for storing the data page comprises means for storing the initial data change indicator in the non-volatile memory.

11. The memory subsystem of claim 9, wherein the initial DCI comprises an error correction code.

12. The memory subsystem of claim 9, wherein the means for retrieving the data page comprises means for storing the data page in a memory register.

13. A method, comprising:
- receiving a data page for storage in a memory, wherein the data page includes data, metadata, an Error Correction Code (ECC) for the data, and an ECC for the metadata;
- transferring the received data page into a register;
- computing an initial data change indicator (DCI) for the received data page;
- storing the computed initial DCI in the memory; and
- transferring the data page from the register to the memory responsive to the storing of the computed DCI in the memory.

14. The method of claim 13, wherein the initial DCI comprises an error detection code (EDC).

15. The method of claim 14, wherein the EDC comprises cyclic redundancy check (CRC).

16. The method of claim 14, wherein the EDC comprises an error correction code (ECC).

17. The method of claim 13, wherein the memory comprises a non-volatile memory.

* * * * *